United States Patent Office 3,780,082
Patented Dec. 18, 1973

3,780,082
PROCESS FOR THE PREPARATION OF
4-OXOCAPRONITRILE
Johannes J. M. Deumens and Siemen H. Groen, Geleen,
Netherlands, assignors to Stamicarbon N.V., Heerlen,
Netherlands
No Drawing. Filed Aug. 5, 1971, Ser. No. 169,512
Claims priority, application Netherlands, Sept. 11, 1970,
7013453
Int. Cl. C07c 121/02
U.S. Cl. 260—465.1         5 Claims

ABSTRACT OF THE DISCLOSURE

Schiff bases derived from acetone and aliphatic lower alkyl primary amine are employed in the reaction of acrylonitrile and an excess of acetone in a liquid medium in the disclosed process for the preparation of 4-oxocapronitrile. The catalysts have a boiling point below 150° C. and are easily recovered from the reaction mixture. The product 4-oxocapronitrile is a starting material in the preparation of α-pipecoline.

BACKGROUND OF THE INVENTION

The present invention relates to a process for the preparation of 4-oxo-capronitrile by reaction of acrylonitrile with acetone. The 4-oxocapronitrile (5-oxohexane-nitrile) is a known starting product in the preparation of other compounds, for instance α-pipecoline.

It is already known according to the disclosure of U.S. Pat. 2,850,519 that the above-described reaction can be carried out in a liquid medium in the presence of a small quantity of acid or an acid compound with an excess of acetone and using, as catalyst, a primary amine or a compound from which a primary amine can be formed, such as a Schiff base. The 4-oxocapronitrile formed can then be recovered by subjecting the reaction mixture to distillation. Cyclohexylamine, in particular, is suggested as catalyst.

Upon further study of this known process using cyclohexylamine as catalyst it has been found that the 4-oxocapronitrile obtained is highly impurified by compounds which can be separated off only with difficulty and expense, and that recovery of the cyclohexylamine catalyst used, as such or as a Schiff base, is impossible to the extent of practical applicability in commercial practice. Other primary amines, too, such as n-dodecylamine, tetramethylene-diamine, 2- and 4-methylcyclohexylamine, hexamethylenediamine, benzylamine, aniline, ortho-, meta- and para-toluidine, phenylenediamine and benzidine, appear to have the same disadvantages as cyclohexylamine.

DETAILED DESCRIPTION OF THE INVENTION

The present invention provides a process in which the above-mentioned disadvantages can be avoided. In the process according to the invention for the preparation of 4-oxocapronitrile by reaction of acrylonitrile with an excess of acetone in a liquid medium in the presence of an acid or an acid compound and using as catalyst a primary amine or a Schiff base and recovery—by distillation of the reaction mixture obtained—of the 4-oxocapronitrile formed the invention is characterized in that as catalyst a Schiff base, with a boiling point below 150° C. and derived from acetone and an aliphatic primary amine, or a mixture of such a Schiff base and the amine derived therefrom, is applied and that the reaction is carried out with at least 3 moles of acetone per mole of acrylonitrile. As the catalyst there may be employed the Schiff base derived from acetone and an aliphatic primary amine or there may be added directly to the reaction mixture an aliphatic primary amine which, upon reaction with the excess acetone present in the reaction mixture, forms the said Schiff base catalyst in situ. Also a mixture of the Schiff base and the amine derived therefrom may be employed.

By the process according to the invention a reaction mixture is obtained which is very suited to be separated by distillation into 4-oxocapronitrile and a catalyst-containing fraction which, together with the non-consumed acetone and the non-consumed acrylonitrile if any, can be again reacted, thus realizing economies in continuous operation. Moreover, only a small quantity of acetone and acrylonitrile is consumed for the formation of the undesired, dicyano-ethylated acetone.

In the process according to the invention various Schiff bases of acetone or acetonimines are suitable, such as the Schiff bases of acetone having a lower alkyl aliphatic primary amine having from 1 to 5 carbon atoms, such as, for example, methylamine, ethylamine, n-propylamine, isopropylamine, n-butylamine, isobutylamine, secondary butylamine and secondary pentylamine. The acetonimines for use according to the present invention can be prepared by a known method from acetone and a primary amine as in U.S. 2,700,682, the disclosure of which is hereby incorporated by reference. Various primary amines are suitable for the purpose. Preparation of the acetonimines occurs following the general reaction:

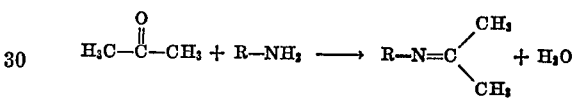

R is an aliphatic alkyl group, having from 1 to 5 carbon atoms. Preference is given to the application of a Schiff base of acetone with a boiling point of less than 125° C. for when such a catalyst is used a catalyst-containing fraction can be recovered from the reaction mixture, which fraction contains only a very small amount of undesired by-products. Particularly suitable as Schiff bases are N-isopropylacetonimine and N-secondary butylacetonimine.

In the process according to the invention it is not necessary for the Schiff base to be added as such to the reaction system. The amine in question may also be added since this is, in whole or in part, converted in the reaction medium into the Schiff base of acetone. The relevant Schiff base may also be formed in the reaction medium by reaction of acetone with the corresponding Schiff base of another ketone such as for instance butanone, pentanones and cyclohexanone.

In the process according to the present invention the quantity of catalyst may be varied depending on the reaction conditions. Generally a quantity of 0.01 to 0.2 mole of catalyst per mole of acrylonitrile to be converted is the most suitable amount for practical purposes. In addition to the catalyst, a small quantity of acid should be present. As in the known process, both organic and inorganic acids or compounds of acid nature in the reaction medium are suitable for that purpose as described in U.S. Patent 2,850,519, the disclosure of which is hereby incorporated by reference.

As previously stated, the molar ratio of acetone to acrylonitrile should be at least 3 to 1 according to the invention. Preferably, a ratio of at least 4 to 1 is applied. Ratios in excess of 12 to 1 involve no particular advantage, but may, in principle, be applied.

Although in the process according to the invention the acrylonitrile may be converted in whole or in part, preference is given to the conversion of not more than 90% of the acrylonitrile because it has appeared that the longer reaction time and/or higher temperature required for a conversion of more than 90% may result in detrimental side reactions.

The temperature of the reaction is preferably chosen between about 75 and about 225° C. because within this range an optimum result can be achieved. The pressure is not critical, but should, in relation to the temperature be chosen so that the reaction can proceed in a liquid medium. If desired, the reaction may also take place in a solvent, but this involves no advantage. When a solvent is used, suitable solvents are, for instance, benzene, toluene and dimethyl sulphoxide.

The resulting product 4-oxocapronitrile is isolated from the reaction mixture, preferably by distillation, and is substantially free from impurities. The 4-oxocapronitrile produced is a known starting product in the preparation of other compounds, such as α-pipecoline. The production of α-pipecoline has been described in the Journal of the American Chemical Society, 72, 1950, page 2594, the disclosure of which is hereby incorporated by reference.

The process according to the invention will be explained in more detail in the following examples, without limiting the invention to these examples. Unless otherwise indicated all percentages are by weight.

EXAMPLE I 0.3 mole of acrylonitrile (15.9 g.) 2.4 moles of acetone (139.2 g.), isopropylamine (2.5 g.) and benzoic acid (0.1 g.) were introduced into a 0.5-liter autoclave. The mixture was heated for 2 hours at a temperature of 180° C. Next, the reaction mixture was rapidly cooled, the autoclave opened and the reaction mixture transferred to a distillation flask. In order for the reaction mixture to be transferred to the distillation flask as completely as possible, the autoclave was subsequently flushed with acetone, as a result of which the quantity of acetone in the distillation flask increased by 8.6 grams. The mixture in the distillation flask was separated by distillation at atmospheric pressure into 136.6 grams of distillate, boiling below 125° C., and 29.3 grams of residue.

Gas chromatographic analysis showed that the distillate contained 130 grams of acetone, 2.2 grams of acrylontrile and 2.9 grams of N-isopropyl-acetonimine. Gas chromatographic analysis of the residue showed that the residue contained 26.1 grams of 4-oxocapronitrile, 0.9 gram of (2-cyanoethyl)-isopropylamine and 1.3 grams of dicyanoethylated acetone.

Of the quantity of acrylonitrile used 86% has been converted. Calculated on the acrylonitrile converted, the efficiency in 4-oxocapronitrile amounted to 91% and, calculated on acetone converted, the efficiency in 4-oxocapronitrile was 85%. Of the 2.5 grams of isopropylamine used, 2.9 grams of N-isopropylacetonimine were recovered in the distillate, so that 30 milligrams of isopropylamine had been consumed per grams of 4-oxocapronitrile.

EXAMPLE II

An autoclave with a content of 0.5 liter was supplied with 115 grams of the distillate obtained in Example I. This quantity of distillate contained 1.86 moles of acetone (108.7 g.), 0.035 mole of acrylonitrile (1.84 g.) and N-isopropylacetonimine (2.4 g.). In addition, 0.226 mole of acrylonitrile (12 g.), 0.258 mole of acetone (15 g.), 0.1 gram of benzoic acid and 1 gram of isopropylamine were introduced into the autoclave. The total mixture represented a ratio of about 8 moles of acetone per mole of acrylonitrile.

The mixture was heated for 2 hours at approximately 180° C. Next, the reaction mixture was rapidly cooled, the autoclave opened and the reaction mixture transferred to a distillation flask. Subsequently, the autoclave was flushed with acetone as in Example I, as a result of which the quantity of acetone in the distillation flask increased by 13.1 grams.

The mixture in the distillation flask was then separated by distillation at atmospheric pressure into 133 grams of distillate, boiling below 120° C., and 23 grams of residue.

The distillate contained 122.3 grams of acetone, 3.2 grams of acrylonitrile and 3.1 grams of N-isopropyl-acetonimine. The residue contained 19.2 grams of 4-oxocapronitrile, 0.9 gram of (2-cyanoethyl)-isopropylamine and 1.8 grams of dicyano-ethylated acetone. 77% of the original amount of acrylonitrile had been converted.

The efficiency in 4-oxocapronitrile amounted to 86% calculated on the acrylonitrile converted and to 71% calculated on the acetone converted 32 milligrams of isopropylamine had been consumed per gram of 4-oxocapronitrile.

EXAMPLE III

An autoclave, with a content of 0.5 liter, was supplied with 125 grams of the distillate obtained in Example II. This amount of distillate contained acetone (115 g.), acrylonitrile (3 g.) and N-isopropyl-acetonimine (2.9 g.). To this distillate acrylonitrile (12.5 g.), acetone (20 g.), benzoic acid (0.1 g.) and isopropylamine (0.5 g.) were added. The resulting mixture had a ratio of 6 moles of acetone per mole of acrylonitrile. The mixture was heated for 2 hours at approximately 180° C. Next, the reaction mixture was rapidly cooled, the autoclave opened and the reaction mixture transferred to a distillation flask. Subsequently, the autoclave was flushed with acetone as a result of which the quantity of acetone in the distillation flask increased by 8.4 grams.

The mixture in the distillation flask was then separated by distillation at atmospheric pressure into 140 grams of distillate, boiling below 130° C., and 25.6 grams of residue. The distillate contained 129 grams of acetone, 3.1 grams of acrylonitrile and 2.8 grams of N-isopropyl-acetonimine. The residue contains 21.6 grams of 4-oxocapronitrile, 0.8 gram of (2-cyanoethyl)-isopropylamine and 2.3 grams of dicyano-ethylated acetone. Of the original amount of acrylonitrile 80% has been converted. The efficiency in 4-oxocapronitrile amounts to 83% calculated on the acrylonitrile converted and to 77% calculated on the acetone converted. 25 milligrams of isopropylamine had been consumed per gram of 4-oxocapronitrile.

EXAMPLE IV

The residues which contained 4-oxocapronitrile obtained in Examples I, II and III, were combined. The resulting mixture was subjected to a distillation at reduced pressure, in which 62.6 grams of virtually pure 4-oxocapronitrile were obtained (boiling point 65–66° C. at 0.7 millimeter mercury $n_D^{25}$ to 1.4303).

EXAMPLE V

An autoclave, with a content of 1 liter was supplied with 0.6 moles of acrylonitrile (31.8 g.), 4.8 moles of acetone (278.4 g.), isopropylamine (5 g.) and acetic acid (0.2 g.). The mixture was heated for 2 hours at a temperature of approximately 180° C. Next, the reaction mixture has rapidly cooled, the autoclave opened and the reaction mixture transferred to a distillation flask. Subsequently, the autoclave was flushed with acetone as a result of which the amount of acetone in the distillation flask increased by 6.5 grams. The mixture in the distillation flask was then separated by distillation at atmospheric pressure into 263.8 grams of distillate, boiling below 125° C., and 56.1 grams of residue. The distillate contained 246.7 grams of acetone, 4.8 grams of acrylonitrile and 6.7 grams of N-isopropyl-acetonimine. The residue contained 48.4 grams of 4-oxocapronitrile, 1.5 grams of (2-cyanoethyl)-isopropylamine and 4.8 grams of dicyano-ethylated acetone. Of the quantity of acrylonitrile used 85% had been converted. The efficiency in 4-oxocapronitrile amounted to 85% calculated on the acrylonitrile converted and 74% calculated on the acetone converted. 20 milligrams of isopropylamine had been consumed per gram of 4-oxocapronitrile.

EXAMPLE VI

An autoclave, with a content of 1 liter was supplied with 3 moles of acetone (174 g.), 0.6 mole of acrylonitrile (31.8 g.) and benzoic acid (0.1 g.). The mixture in the autoclave was heated to 150° C. under autogenic pressure, whereupon in 4 minutes' time a solution consisting of 2.5 grams of secondary butylamine, 0.1 gram of benzoic acid and 34.8 grams of acetone (0.6 mole) was pumped into the autoclave via a line. The total ratio of acetone to acrylonitrile was 6 to 1. Next, the mixture in the autoclave was maintained for 2 hours at a temperature of approximately 152° C. The reaction mixture was then rapidly cooled, the autoclave opened and the reaction mixture transferred to a distillation flask. Subsequently, the autoclave was flushed with additional acetone as a result of which the quantity of acetone in the distillation flask increased by 13.6 grams.

The weight of the mixture in the distillation flask amounted to 256.9 grams. According to gas chromatographic analysis this mixture contained 199 grams of acetone, 13.9 grams of acrylonitrile, 33.1 grams of 4-oxocapronitrile and 2.8 grams of N-secondary butylacetonimine.

The conversion of the acrylonitrile amounted to 56%. The efficiency in 4-oxocapronitrile amounted to 88% calculated on the acrylonitrile converted and to 79% calculated on the acetone converted. 21 milligrams of secondary butylamine had been consumed per gram of 4-oxocapronitrile.

The mixture in the distillation flask, in the same manner as in the preceding examples could be separated by distillation.

What is claimed is:

1. A process for preparing 4-oxocapronitrile by reacting acrylonitrile and acetone in the presence of a catalyst comprising the steps of:
   (a) reacting acrylonitrile with acetone in the ratio of 4 to 12 moles of acetone per mole of acrylonitrile, in a liquid medium, at a temperature of about 75° C. to about 225° C. and in the presence of an acid or an acidic compound and from 0.01 to 0.2 mole of a catalyst, per mole of acrylonitrile to be converted, said catalyst selected from the group consisting of N-isopropyl-acetonimine and N - secondary - butyl-acetonimine;
   (b) separating the 4-oxocapronitrile from the thus produced reaction mixture; and
   (c) separating a catalyst-containing portion from the reaction mixture and reusing same in Step a.

2. In a process for the preparation of 4-oxocapronitrile by reaction of acrylonitrile at a temperature of about 75° C. to about 225° C. with an excess of quantity of acetone in a liquid medium in the presence of an acid or an acidic compound, with a primary amine or a Schiff base as catalyst, and recovery by distillation of the reaction mixture thus obtained of the 4-oxocapronitrile formed, the improvement wherein the Schiff base catalyst is an acetonimine of the formula

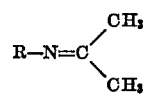

where R is lower alkyl having from 1-5 carbon atoms, said catalyst present in an amount of from 0.01 to 0.2 mole of catalyst per mole of acrylonitrile to be converted, and the reaction is carried out with 4–12 moles of acetone per mole of acrylonitrile.

3. Process according to claim 2 wherein Schiff base is N - isopropyl - acetonimine or N - secondary butyl-acetonimine.

4. Process according to claim 2 wherein the Schiff base is derived from acetone and a primary amine selected from the class consisting of methylamine, ethylamine, N-propylamine, isopropylamine, n-butylamine, isobutylamine, secondary butylamine and secondary pentylamine.

5. The process according to claim 2 wherein said acid is benzoic acid or acetic acid.

References Cited
UNITED STATES PATENTS
2,850,519   9/1958   Krimm _____ 260—465.1 XR JOSEPH P. BRUST, Primary Examiner U.S. Cl. X.R.
260—465.8 R